US005906039A

United States Patent [19]

Fukami et al.

[11] Patent Number: 5,906,039

[45] Date of Patent: May 25, 1999

[54] ATTACHER OF LOOP PIN FOR HOOKING TAG

[75] Inventors: Syouchi Fukami, Tokyo; Tomoyuki Hirai, Chibasi, both of Japan

[73] Assignee: J.E. Kabushiki Kaisha, Tokyo, Japan

[21] Appl. No.: 08/933,956

[22] Filed: Sep. 19, 1997

[30] Foreign Application Priority Data

Mar. 17, 1997 [JP] Japan .................................... 9-083350

[51] Int. Cl.[6] .............................. B23P 19/04; B65C 7/00

[52] U.S. Cl. ................................................ 29/566; 227/67

[58] Field of Search .................................... 29/33 R, 566, 29/564.6, 811.2, 235, 566.4; 227/67; 221/74

[56] References Cited

U.S. PATENT DOCUMENTS

| | | | |
|---|---|---|---|
| 4,593,844 | 6/1986 | Bone | 227/67 |
| 4,664,306 | 5/1987 | Levy | 221/74 X |
| 4,969,589 | 11/1990 | Kim | 227/67 |
| 5,020,713 | 6/1991 | Kunreuther | 227/67 |
| 5,152,445 | 10/1992 | Furutsu | 227/67 |
| 5,501,002 | 3/1996 | Fukami | 29/811.2 |
| 5,639,006 | 6/1997 | Kim | 227/67 |

*Primary Examiner*—William Briggs
*Attorney, Agent, or Firm*—Frishauf, Holtz, Goodman, Langer & Chick

[57] ABSTRACT

An attacher of a loop pin for hooking a tag includes a turnable lever connected to a lower end of a link which is biased in a predetermined direction, a piston holder connected to another end of the link which slides forwardly and backwardly along a guide bar, and a tubular piston bar having a pressing portion formed with a slit at a distal end thereof, a rear end of the piston bar being bent into an L-shaped configuration and mounted on the piston holder.

20 Claims, 20 Drawing Sheets

ATTACHER OF LOOP PIN FOR HOOKING TAG

BACKGROUND OF THE INVENTION

This invention relates to an attacher of a loop pin for hooking a tag, and more particularly to an attacher for attaching a loop pin for hooking a tag, which is indicative of price and quality of a product of commerce, to a product in a one-touch operation.

Heretofore, the above-mentioned type of loop pins have been known wherein an insertion portion having an engagement portion formed on one end of a plastic wire, which is stretched so as to have an appropriate degree of resilience and toughness, is inserted into a sleeve-like receiving portion which is formed at the other end of the plastic wire and which has an escape preventive portion which is formed inside the sleeve-like receiving portion, with the engagement portion engaged with the escape preventive portion. In the known loop pins, these component parts are integral with each other.

In the past, it was customary that such loop pins were individually manufactured and used in their separated condition, not as a unit or assembly of pins. And when in use, the tags manually hooked on the loop pins were manually attached, one by one, to each product of commerce. This manual work lacked efficiency and required substantial time. In addition, due to hard use of their fingers, the workers were liable to suffer from such workers' accidents as tendovagunitis, etc.

Under the circumstances, in order to increase the working efficiency, to reduce the time required for the work and to decrease burdens incurred to workers, a loop pin attacher was lately developed in which a tag can be attached to a product of commerce by a one-touch operation of gripping a lever. Simultaneously, a magazine was also developed in which loop pins are arranged in array on a base member such that the loop pins can be loaded on the loop pin attacher in a sequential manner.

However, the conventional loop pin attachers so far developed have shortcomings in that the overall size is increased due to component parts of the construction of the attachers, feed of the loaded loop pins is not stable in accuracy and reliability, and cutting off the loop pins as a magazine from the base member is also not stable.

SUMMARY OF THE INVENTION

The present invention has been accomplished in view of the above-mentioned actual situation and the problems. It is, therefore, an object of the present invention to provide, in order to obviate those problems inherent in the conventional devices, an attacher of a loop pin for hooking a tag which is designed to be small in size, increased in working accuracy and enhanced in smoothness of operation.

With a view to achieving the above object, according to the present invention, there is essentially provided an attacher of a loop pin for hooking a tag comprising a turnable lever connected to a lower end of a link which is biased in a predetermined direction, a piston holder connected to another end of the link and capable of sliding forwardly and backwardly along a guide bar, and a tubular piston bar having a pressing portion formed with a slit at a distal end thereof, a rear end of the piston bar being bent into an L-shaped configuration and mounted on the piston holder.

It is preferable that the attacher of a loop pin for hooking a tag further comprises a gear body driven by a rack gear which is connected to the link through a crank-like rack link and engageable with a belt for pressing a receiving portion of the loop pin, and a feed bar operatively connected to the piston holder so as to be driven through a rotor which is provided with at least two projecting engagement portions.

A time lag in feeding of the loop pin can be obtained between an insertion portion and a receiving portion by the rack link.

Preferably, an auxiliary cover for cutting a loop pin magazine into individual loop pins is connected to a base portion of a receiving portion guide of a loop pin which is formed in a J-shaped configuration.

A load portion for the loop pin may be provided with a pin guide.

A terminal end of a guide groove for the receiving portion guide of a loop pin which is formed in a J-shaped configuration is preferably bent.

It is preferable that a restraining plate is placed upon an attachment plate for the receiving portion guide of a loop pin which is formed in a J-shaped configuration, and that the restraining plate is provided at one end thereof with a guide groove for the piston bar, with a tag hook portion being formed at a distal end of the guide groove.

It is also preferable that the gear body includes an enlarged diameter gear and a reduced diameter gear, the enlarged diameter gear being engageable with the belt and the reduced diameter gear being engageable with an intermediate length diameter gear which is engageable with a rack gear, wherein a plurality of the loop pins being connected together in parallel relation at the receiving portion and insertion portion, and a cutter for cutting the loop pin assembly into individual loop pins from the receiving portion and insertion portion, wherein the intermediate length diameter gear includes two coaxial gears having different diameters, one of the two coaxial gears having a smaller diameter being engaged with the rack gear and the remaining coaxial gears having a larger diameter being engaged with the reduced diameter gear of the gear body, so that a time lag in feeding of the loop pin between the receiving portion and the insertion portion can be obtained due to a gear ratio therebetween.

The rack gear may be formed with a releasing groove for avoiding a physical contact with the enlarged diameter portion of the intermediate length diameter gear.

Preferably, a coiled spring for biasing the intermediate length diameter gear in a counterclockwise direction is wound around a shaft member of the intermediate length diameter gear, so that a feeding force of the receiving portion for the loop pin is increased.

By virtue of the above-mentioned construction, an attacher as a final product of the present invention can be designed to be thin and small in physical size, feed of the loaded loop pins is high in correctness and accuracy, the loop pins can be cut off smoothly from the magazine, as applicable, and a receiving portion for the loop pins can be prevented from jumping out of a receiving portion guide.

Furthermore, owing to two gears having an intermediate length diameter, one placed upon the other, an increased gear ratio can be obtained compared with the prior art devices, and a distinct time lag can be obtained in feeding of the loop pin between the insertion portion and the receiving portion. As a consequence, the feeding operation can be performed accurately and smoothly. Since the gear having an intermediate length diameter is provided with a coiled spring for applying a biasing force in a counterclockwise direction, an increased long-distance pressure feeding force can be obtained compared with the receiving portion and insertion portion for the loop pin. As a consequence, a reliable working performance can be obtained.

DETAILED DESCRIPTION OF THE EMBODIMENT

Figure 1:
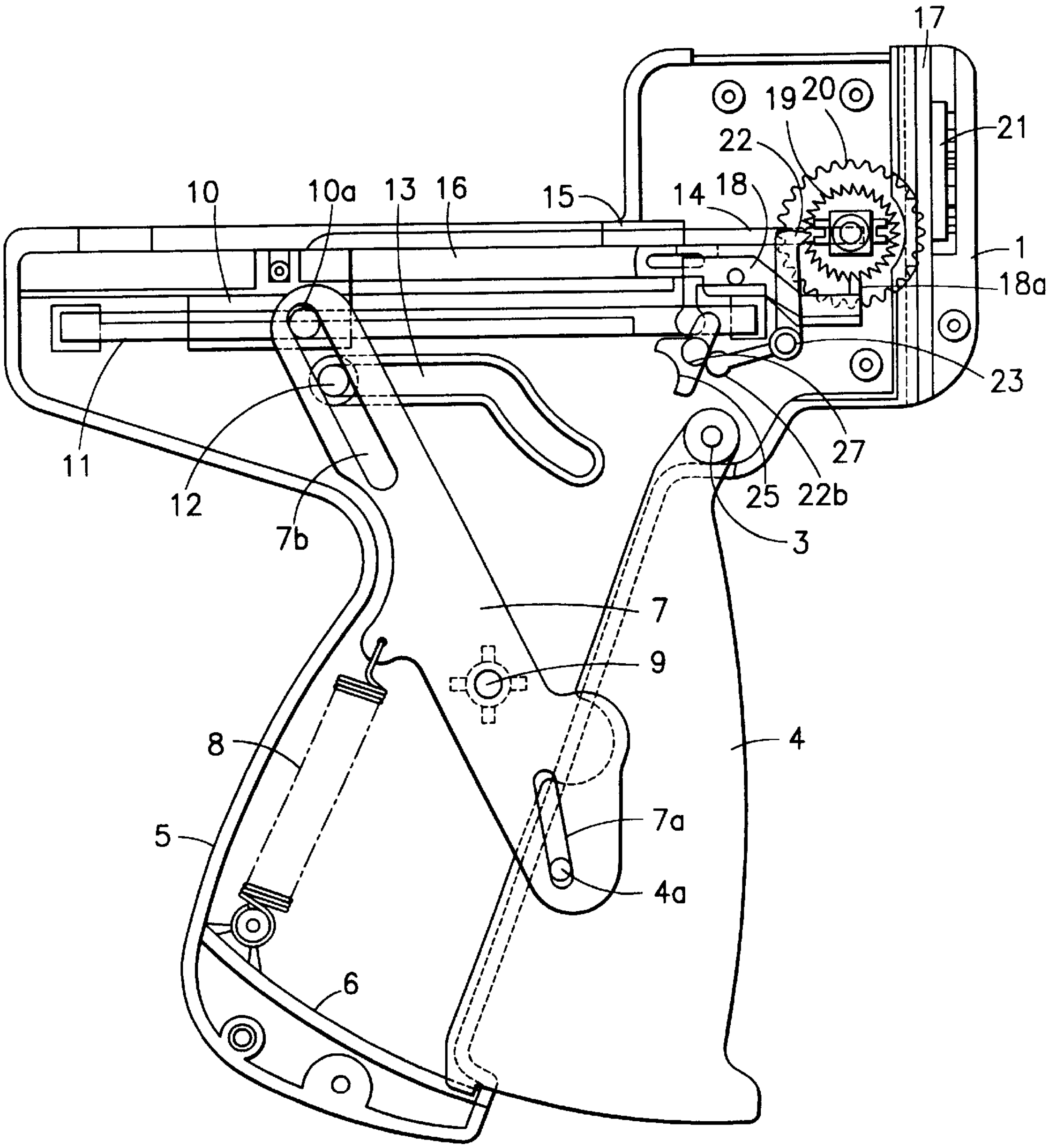
FIG. 1 is a side view of a mechanism in a first-half body case.
Figure 2:
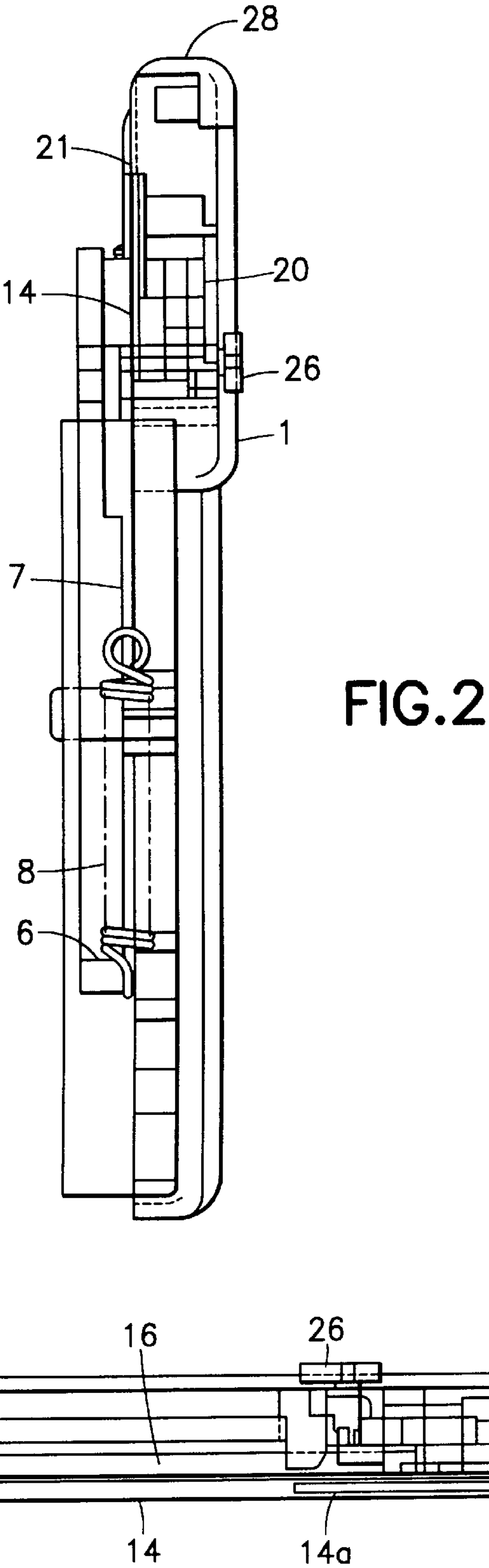
FIG. 2 is a front view.
Figure 3:
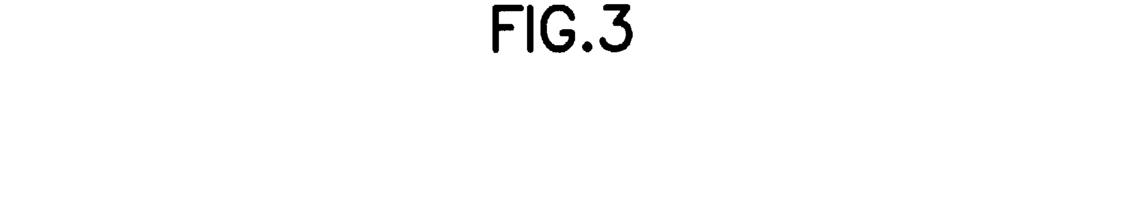
FIG. 3 is a plan view.

One preferred embodiment of the present invention will now be described in detail with reference to the accompanying drawings which constitute a part of this specification.

In the drawings, reference numeral 1 denotes a first-half body case and 2 denotes a second-half body case. The first half body case 1 and the second-half body case 2 are joined together with screws. By doing so, a jacket case is constituted. A turnable lever 4 is pivotally supported on a pin 3 which is provided on the first-half body case I such that the lever 4 can be brought into and out of a grip portion 5 which is opened at its front. Reference numeral 6 denotes a drive guide which slidingly contacts a lower end face of the turnable lever 4.

Reference numeral 7 denotes a link disposed within the grip portion 5. This link 7 is tension biased by a coiled spring 8 one end of which is secured to the drive guide 6 and can turn about a pin 9 as a fulcrum. A slot 7*a* is formed in a lower end of the link 7. A pin 4*a* provided on the drive lever 4 is engaged in this slot 7*a*. By doing this, the link 7 and the drive lever 4 are connected together. The turnable lever 4 is normally biased forwardly under the effect of the coiled spring 8.

An elongated circular cam groove 7*b* is formed in an upper end of the link 7 in a longitudinal direction thereof. An upper end portion of the cam groove 7*b* is in engagement with a pin 10*a* projecting from a side wall surface of a piston holder 10 which is usually located at a rather inner end of the body case 1, and can be slid forwardly and backwardly through the link 7 when the turnable lever 4 is operated. A through-hole 10*b* is formed in the piston holder 10 in a forward and backward direction thereof. A cover guide 11, which is inserted into the through-hole 10*b*, is secured to the body case 1.

A head portion of a rack collar 12 to which one projection of a rack link as later described is to be fitted is engaged with an intermediate part (normally) of the cam groove 7*b* of the link 7. In order to provide a sense of click at a final stage of operation, the rack collar 12 is in engagement with a cam groove 13 which is downwardly curved at its front side at dull angles.

A receiving bore 10*c* is formed in an upper surface of the piston holder 10 at its forward location. A rear end of a piston bar 14 which is bent in an L-shape is fitted for retention to this receiving bore 10*c*. The piston bar 14 is formed as a tubular member. A slit 14*a* is formed in an upper surface of the tubular piston bar 14 from its front end opening to its intermediate part. An intermediate string portion of the loop pin is guided by this slit 14*a*, and an insertion portion (male portion) of the loop pin is pushed with a distal end opening edge of the piston bar 14. Reference numeral 15 denotes a tubular guide for guiding a sliding movement of the piston bar 14.

Reference numeral 16 denotes a feed bar. This feed bar 16 is adapted to feed a loop pin magazine loaded on a load section of the loop pin magazine at a pitch of one piece unit, from above to under in this embodiment. The feed bar 16 is operatively connected to the aforementioned piston holder 10. A feed actuation member 18 is continuously connected to a front end of the feed bar 16. A feed hook 18*a* is formed on an upper portion of a distal end of the feed actuation member 18.

The hook 18*a* of the feed actuation member 18 is meshed with a ratchet 19. This ratchet 19 is coaxially rotated with a feed gear 20 which is engaged for feeding with the loop pin magazine. Reference numeral 21 denotes a cutter for cutting the loop pin magazine into individual loop pins each as a unit.

Figure 4:
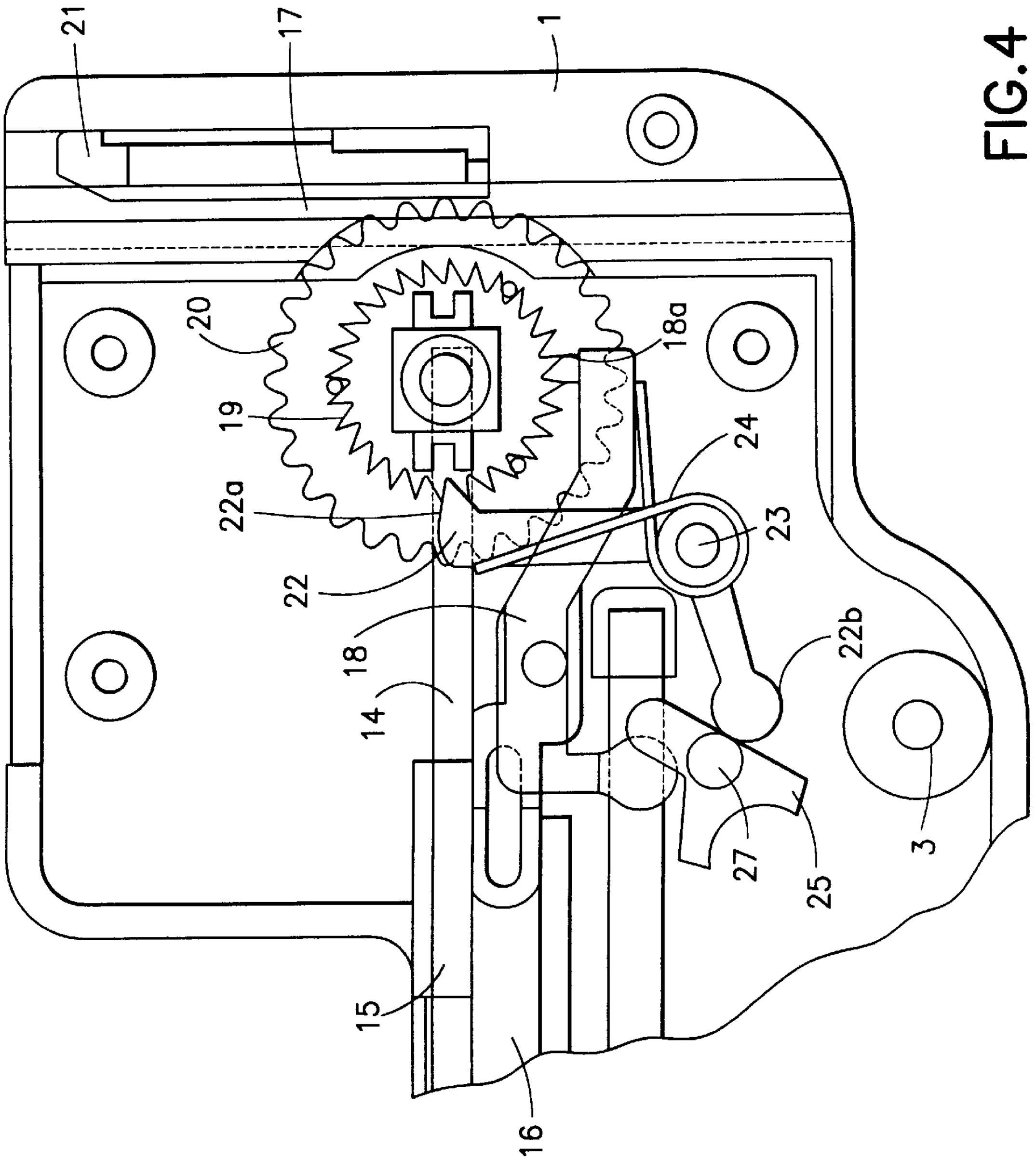
FIG. 4 is a partly enlarged view.
Figure 5:
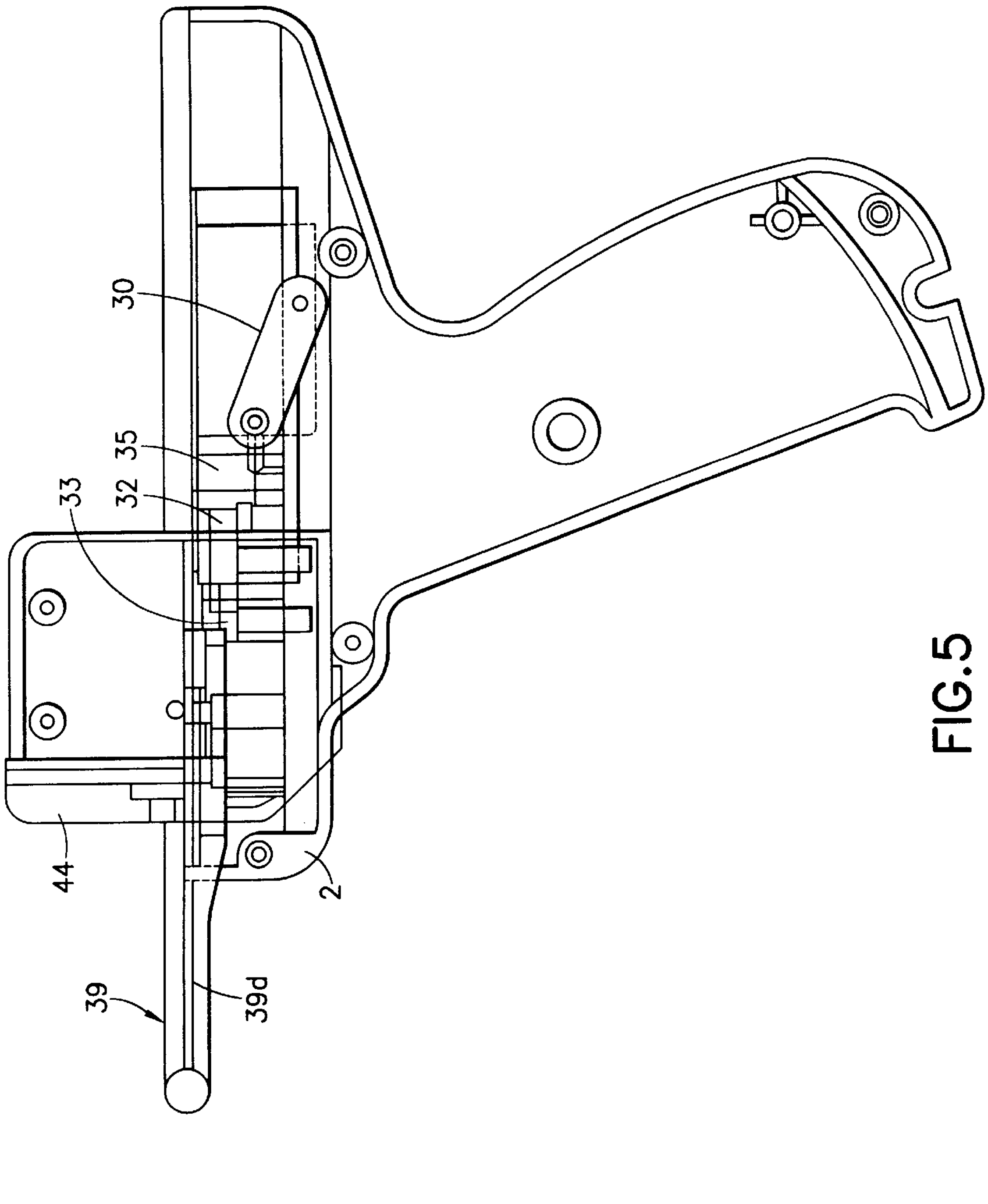
FIG. 5 is a side view of a mechanism in a second-half body case.
Figure 6:
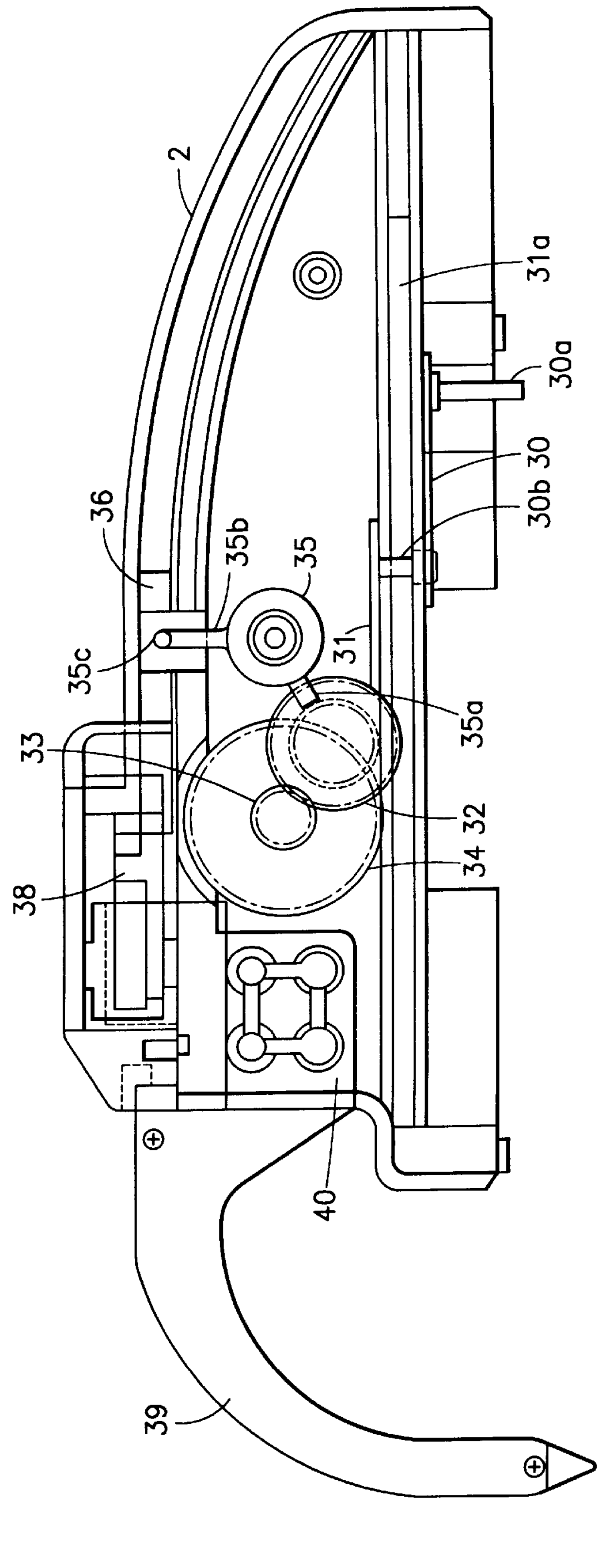
FIG. 6 is a plan view.
Figure 7:
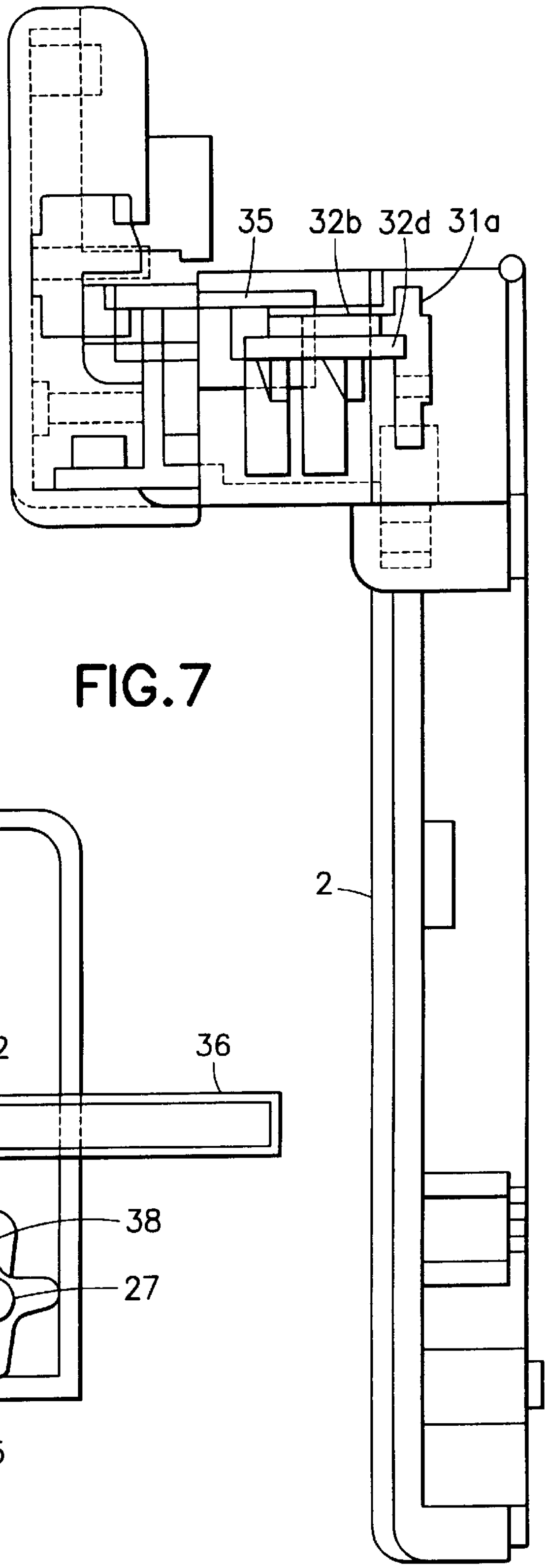
FIG. 7 is a front view.
Figure 8:
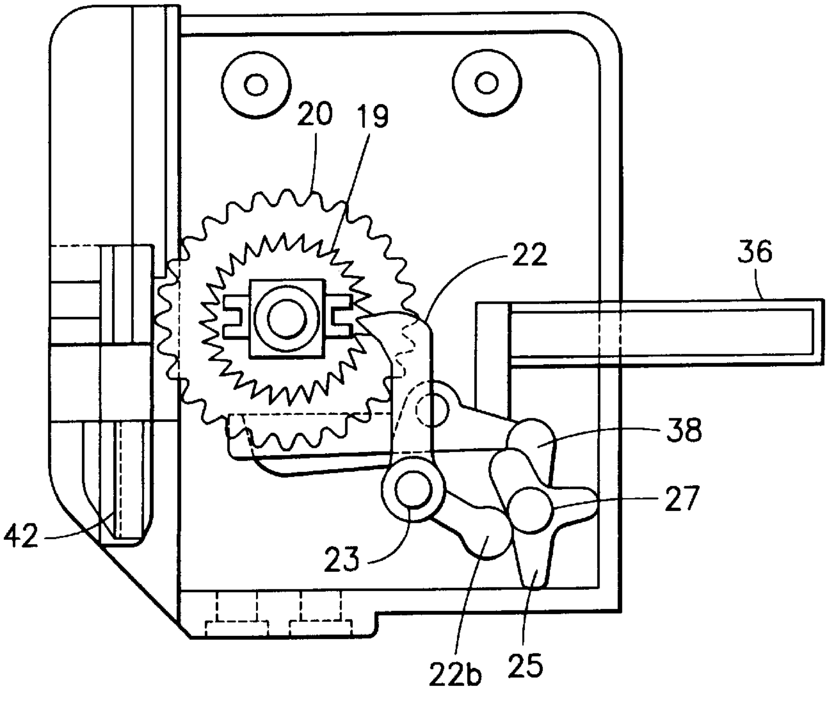
FIG. 8 is a view showing a distal end portion.
Figure 9:
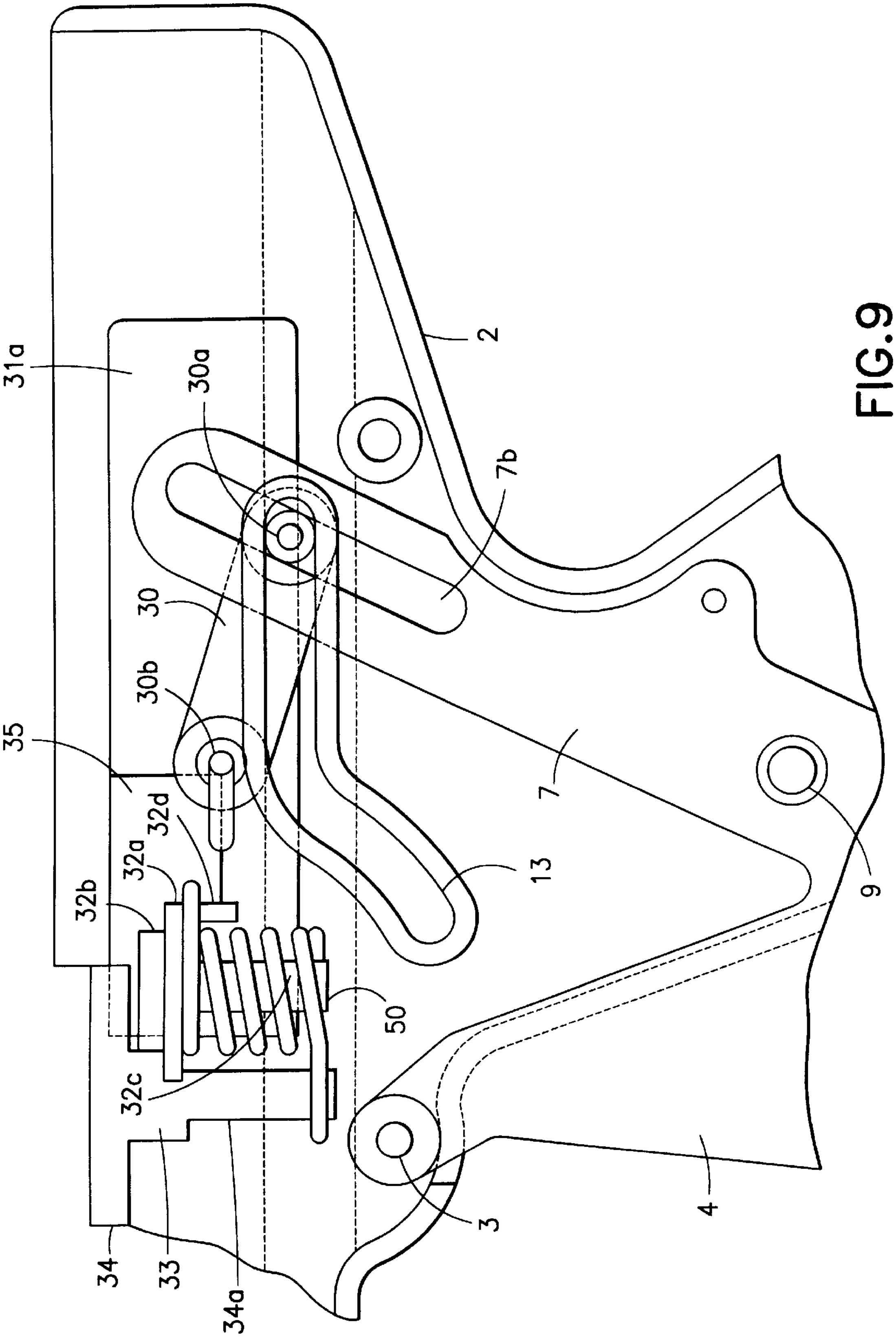
FIG. 9 is a side view of the mechanism partly enlarged.

Reference numeral 22 denotes a stopper for the ratchet 19. This stopper 22 is bent in a generally dogleg like configuration. An upper end of the stopper 22 is serves as a claw-like engagement portion 22*a* for engagement with the ratchet 19 and the other end is served as a releasing manipulator 22*b* for removing the loop pin magazine from the load section 17. The stopper 22 can turn about the pin 23 as a fulcrum. This pin 23 is attached with a spring 24 of the type as best shown in FIG. 4. One end of the spring 24 is in contact with a lower surface of a distal end of the feed actuation member 18, so that the distal end of the feed actuation member 18 is biased upwardly to force the hook 18*a* to engage the ratchet 19. The other end of the spring 24 is in contact with a rear surface of the claw portion 22*a* to force the claw portion 22*a* to engage the ratchet 19.

The releasing manipulator 22*b* is in contact with a side wall of a first releasing member 25. This first releasing member 25 is provided, as one set, on a pin 27 together with a second releasing member 26 which is disposed on an outer surface of the body case 1. By externally operating the second releasing member 26, the first releasing member 25 is also operated. The first releasing member 25 is turnable about the pin 27, so that the releasing manipulator 22*b* is pushed, by a rotational force thereof, to disengage the claw portion 22*a* from the ratchet 19.

Reference numeral 28 denotes a cover plate which covers an upper opening of the body case 1. This cover plate 28 is formed at an upper end thereof with a bent portion 28*a*. Attachment holes 28*b* are formed in the bent portion 28*a* and in an area offset towards a lower end thereof, respectively. A rectangular window openings 28*c* are formed at two places.

Reference numeral 29 denotes a guide pin. This guide pin 29 includes engagement hooks 29*a* which are formed in a rear surface of each engagement hook 29*a*. The guide pin 29 can be attached to the cover plate 28 with the engagement hooks 29*a* hooked on the window openings 28*c*. One side edge 29*b* of the guide pin 29 is tapered and a corner portion 29*c* of its one side edge 29*b* is further decreased in taper angle, so that a smooth attaching operation will not be enhanced. By attaching this guide pin 29, a more reliable holding to the piston bar 14 is ensured with the insertion portion (male portion) in the loop pin disposed along the guide pin 29.

On the other hand, the second-half body case 2 (side cover) is chiefly provided with a feed mechanism on the receiving portion (female portion) side of the loop pin. A first support rod 30*a* of the rack link 30 is fitted to the rack collar 12 which is in engagement with the cam groove 7*b* of the link 7. The rack link 30 is provided with a second support rod 30*b* having a clank-like configuration, namely, the second support rod 30*b* being projected in an opposite direction at right angles to the first support rod 30*a*. The second support rod 30*b* extends through a rack gear plate 31*a* which is formed in a single surface thereof with a rack gear 31 and the projecting end is fixedly attached by an E ring 30*c*. That is, owing to a provision of this rack link 30, a motion of the link 7 is transmitted to the rack gear plate 31*a* formed with the rack gear 31.

As previously mentioned, the rack gear plate 31*a* is provided on its single surface with the rack gear 31, and also with a through-hole 31*b* formed in a generally central part thereof. The second support rod 30*b* of the rack link 30 is allowed to enter the interior of this through-hole 31*b*.

This rack gear 31 is engageable with an intermediate length diameter gear 32 among a group of gears for feeding the receiving portion of the loop pin. The intermediate length diameter gear 32 consists of an enlarged diameter portion 32*a* and a reduced diameter portion 32*b* coaxially placed thereupon. The enlarged diameter portion 32*a* and the reduced diameter portion 32*b* are synchronously rotated through the same shaft 32*c*. The reduced diameter portion 32*b* is engageable with the rack gear 31. To this end, the rack gear plate 31*a* is formed with a releasing groove 31*b* in order to prevent a physical contact with the enlarged diameter portion 32*a*. Reference numeral 31*c* denotes a through-hole for the second support rod 30*b*.

The enlarged diameter portion 32*a* of the intermediate length diameter gear 32 is engaged with a most reduced diameter gear 33, thereby to drive a most enlarged diameter gear 34 which can be turned about the same shaft 34*a* of the most reduced diameter gear 33. Two engagement projections 32*d* are formed on a lower surface of the enlarged diameter portion 32*a* of the intermediate length diameter gear 32.

This engagement projection 32*d* is in engagement with a first engagement arm 35*a* projecting from a rotor 35 which is disposed proximate to the intermediate length diameter gear 32, so that a rotational force is transmitted to the rotor 35. The rotor 35 has an engagement plate 35*b* extending in the other direction. An engagement projection 35*c* is formed on a distal end of the engagement plate 35*b*. The engagement projection 35*c* is engaged with a feed bar 36 for feeding the loop pin magazine from above to under, so that the feed bar 36 is driven.

Figure 10:
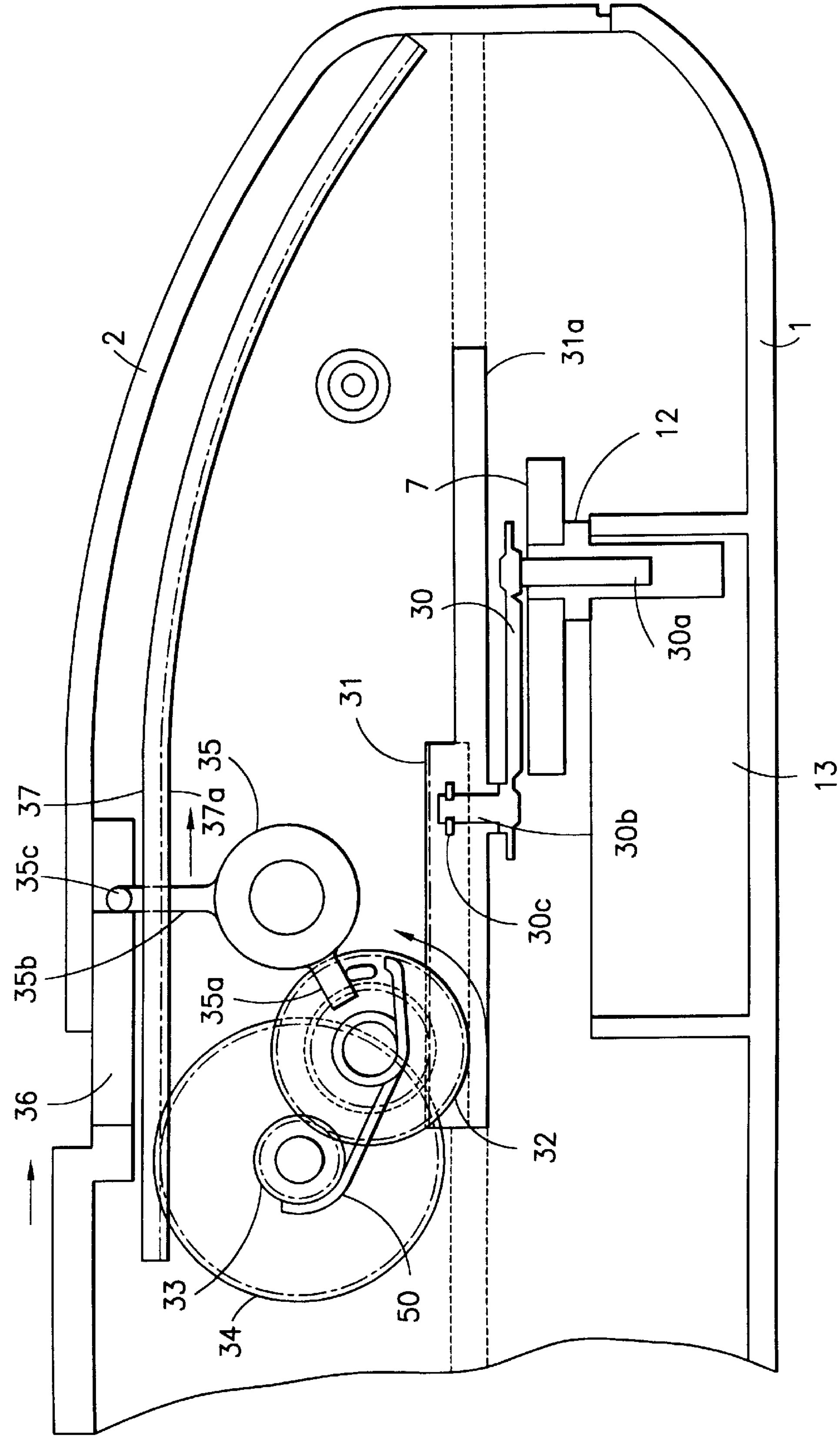
FIG. 10 is a plan view.
Figure 11:
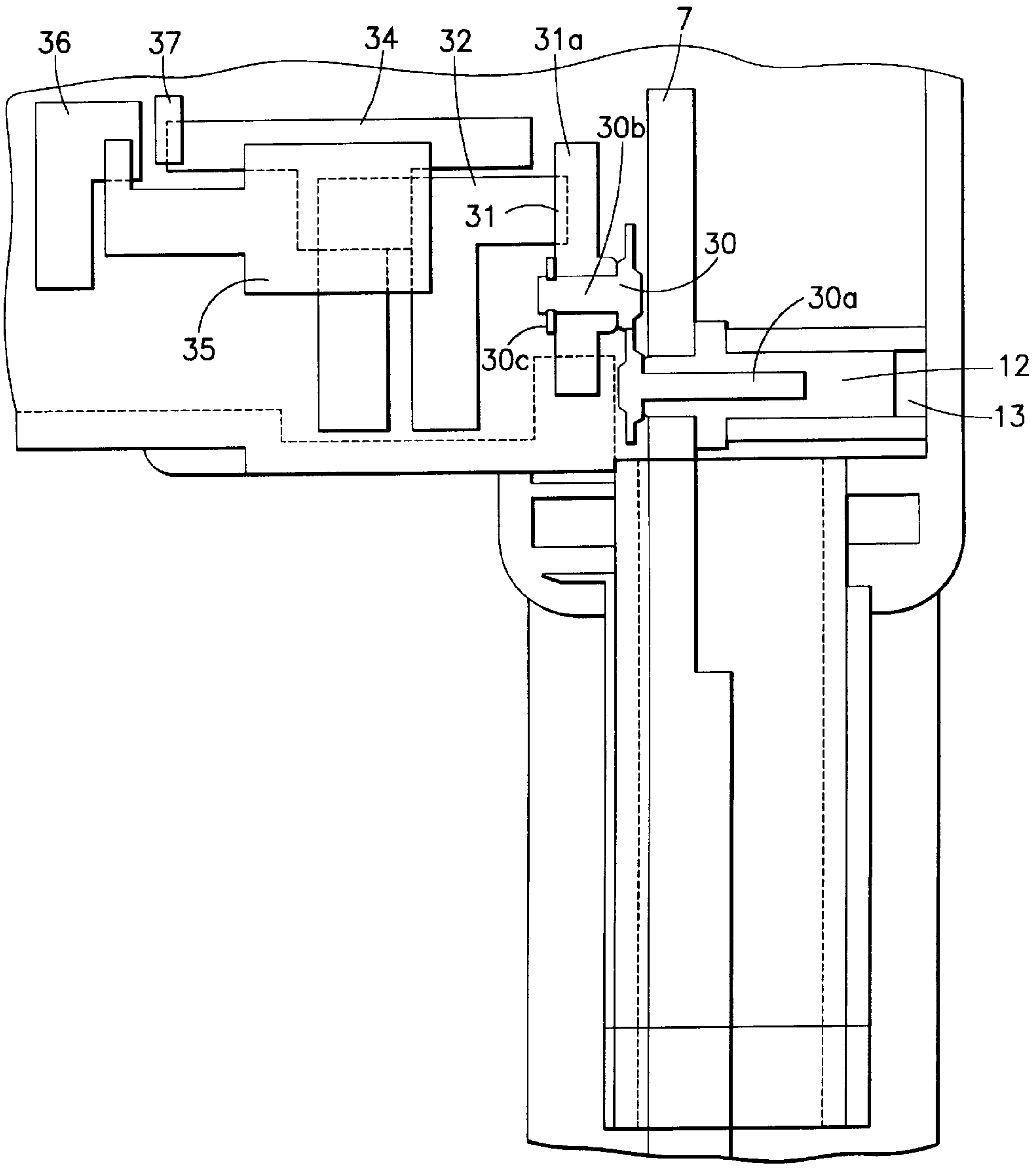
FIG. 11 is a front view.
Figure 12:
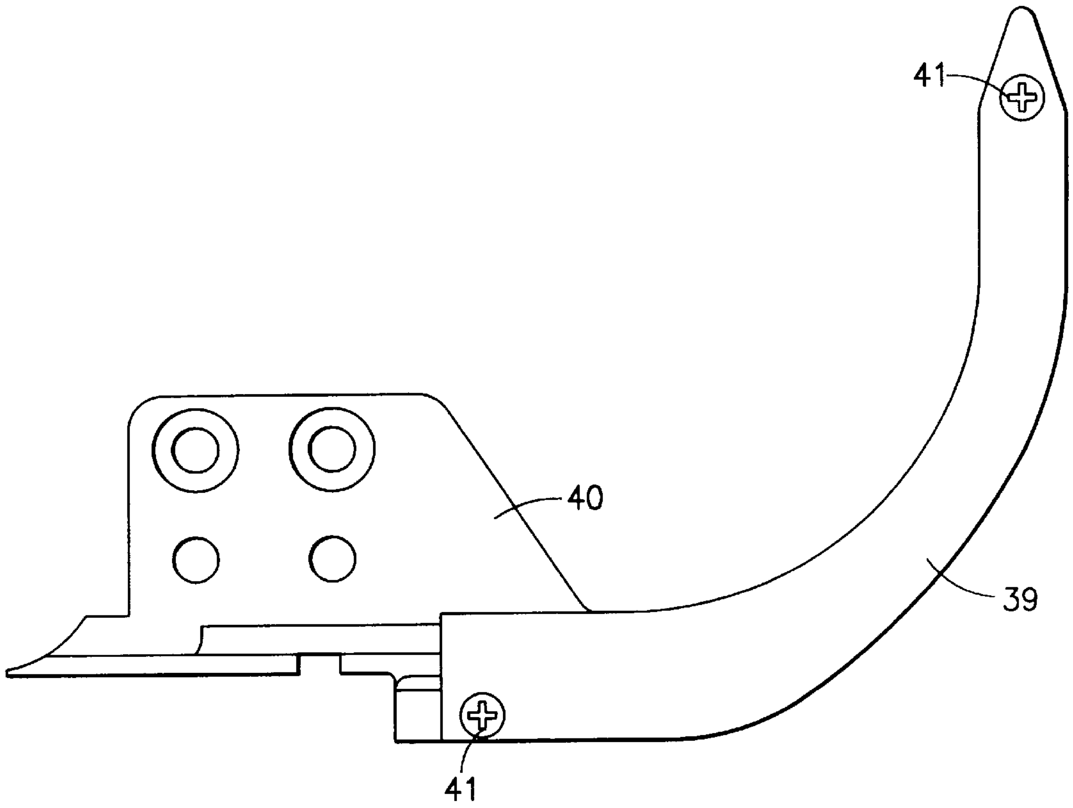
FIG. 12 is a plan view of a receiving portion guide.
Figure 13:
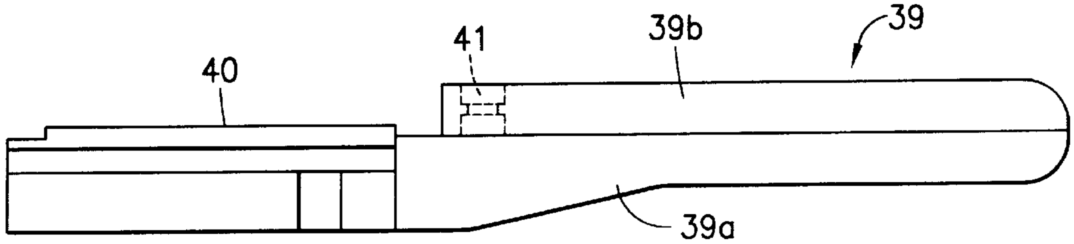
FIG. 13 is a side view.
Figure 14:
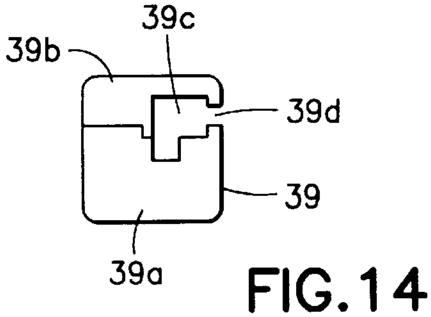
FIG. 14 is an end face view.
Figure 15:
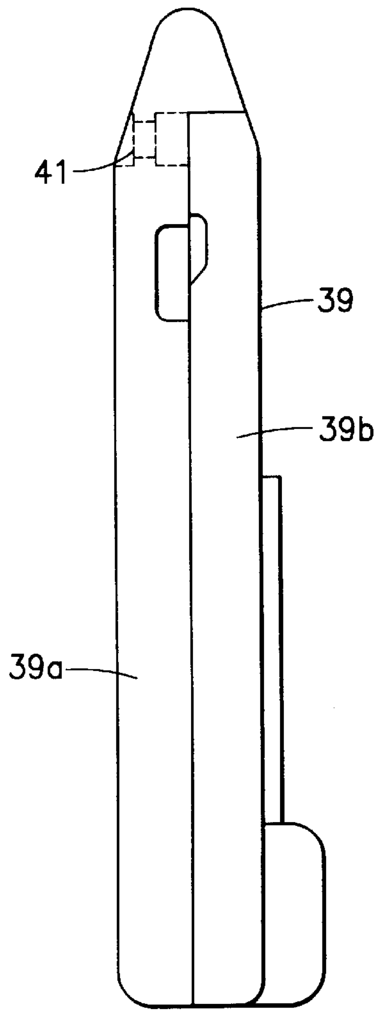
FIG. 15 is a front view.
Figure 17:
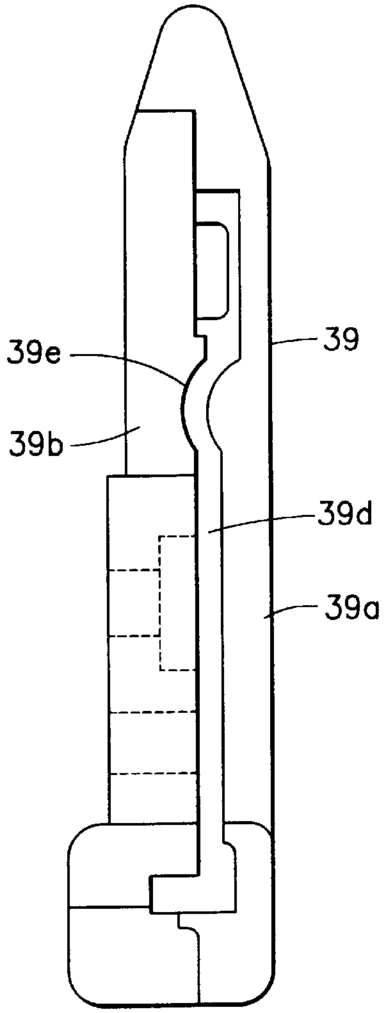
FIG. 17 is a rear view.
Figure 16:
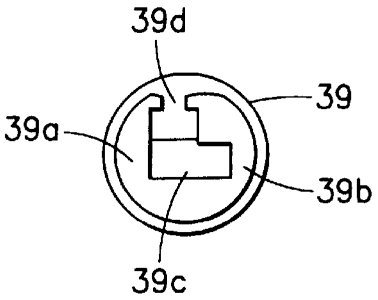
FIG. 16 is a distal end face view.
Figure 18:
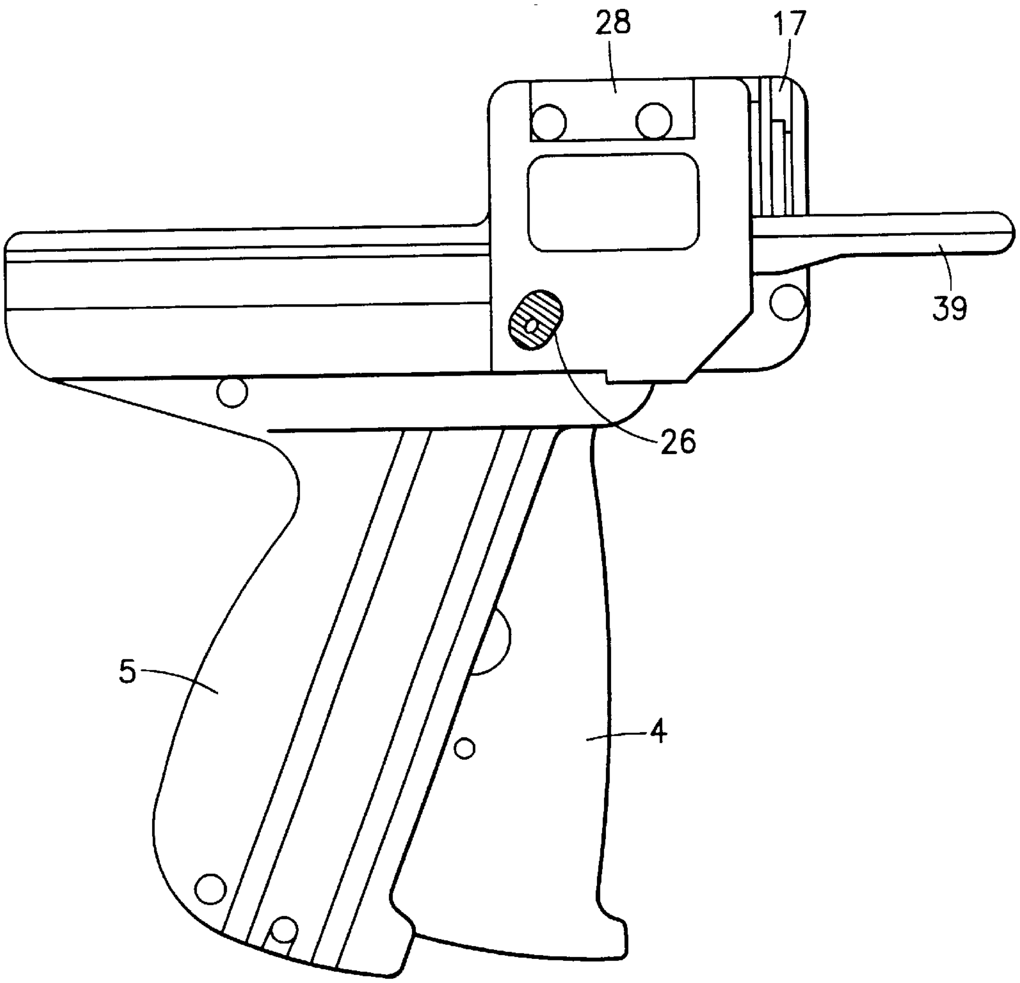
FIG. 18 is a side view of an outer appearance.
Figure 19:
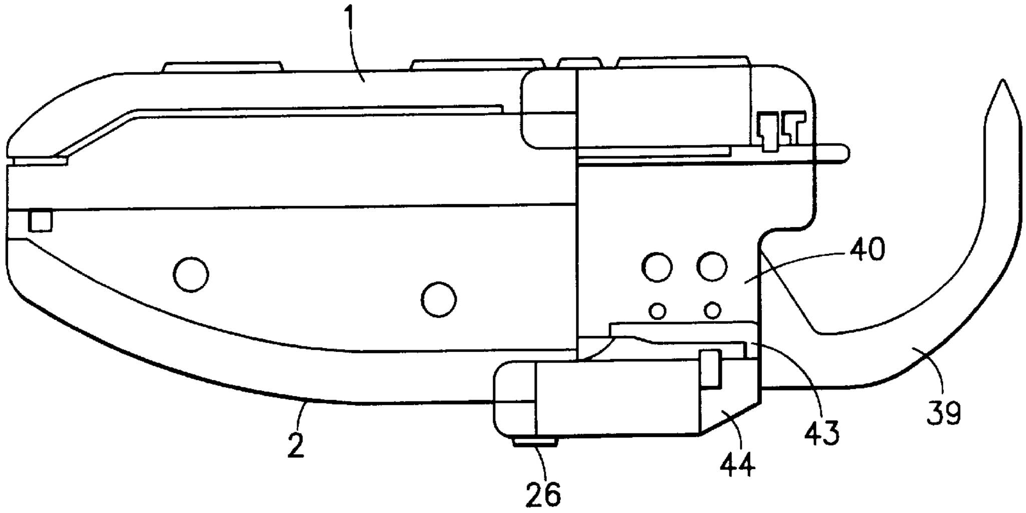
FIG. 19 is a plan view.
Figure 20:
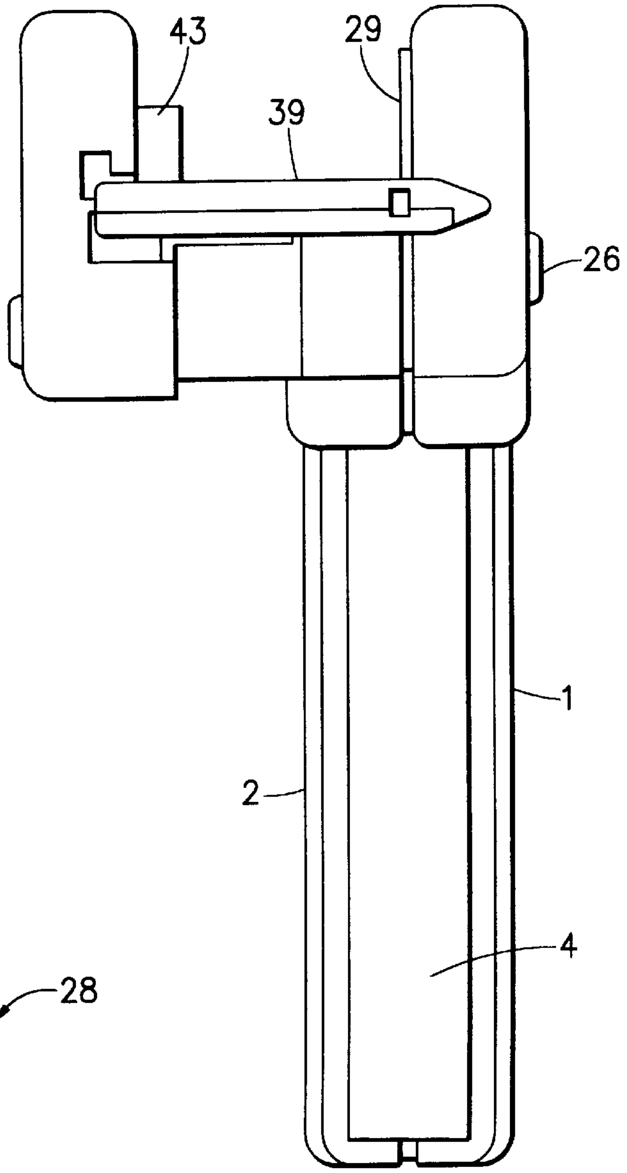
FIG. 20 is a front view.
Figure 21:
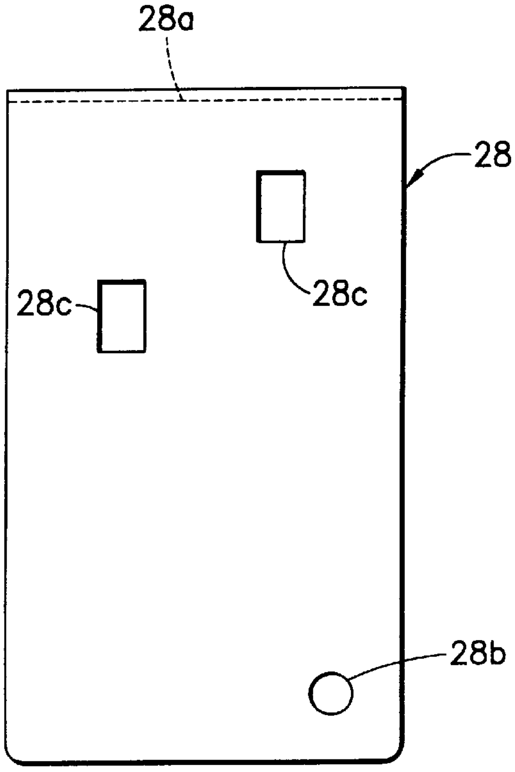
FIG. 21 is a front view of a cover plate.
Figure 22:
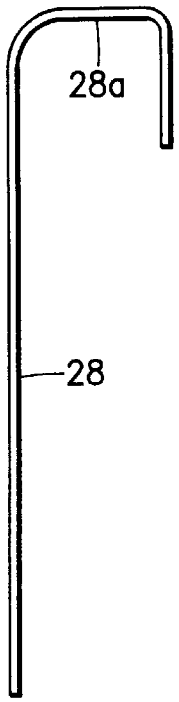
FIG. 22 is a side view.
Figure 23:
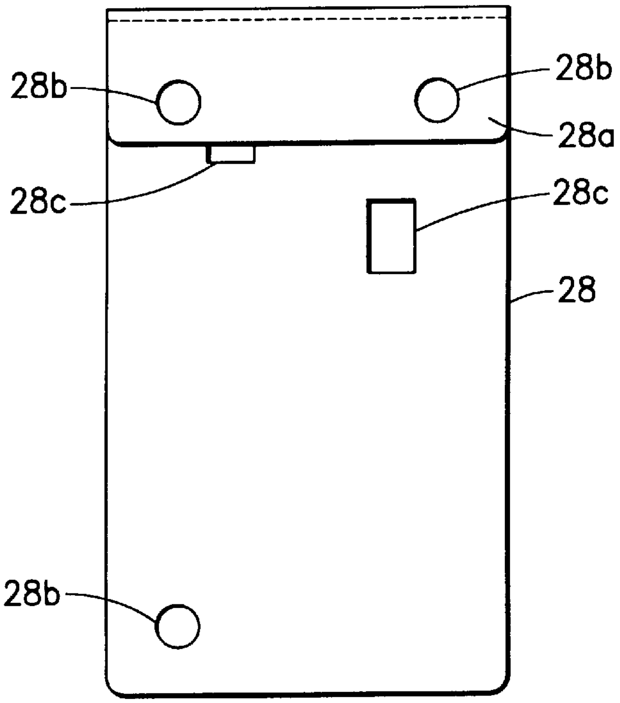
FIG. 23 is a rear view.
Figure 26:
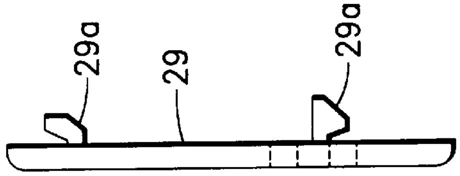
FIG. 26 is a side view.
Figure 27:
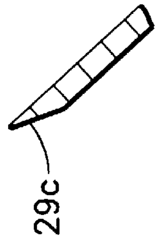
FIG. 27 is a view showing a distal end of an upwardly press-worked portion.
Figure 24:
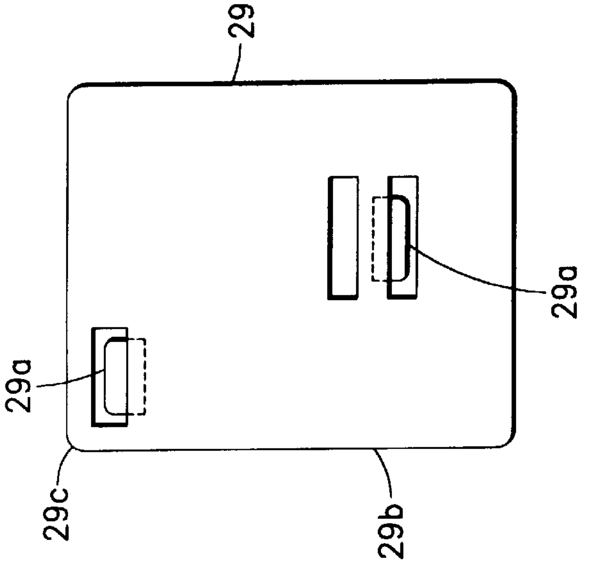
FIG. 24 is a front view showing a pin guide.
Figure 25:
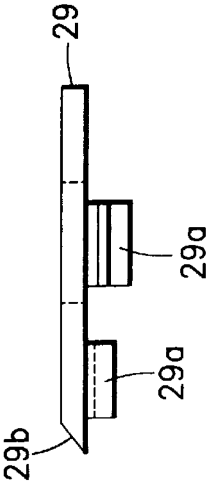
FIG. 25 is a bottom view.
Figure 30:
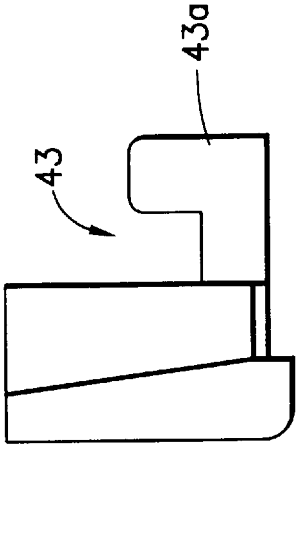
FIG. 30 is a right side view.
Figure 31:
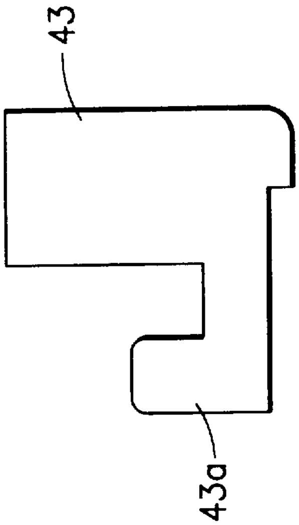
FIG. 31 is a left side view.
Figure 28:
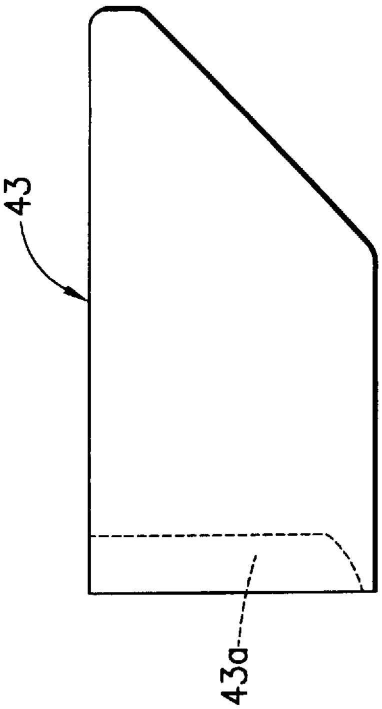
FIG. 28 is a front view showing an auxiliary cover.
Figure 29:
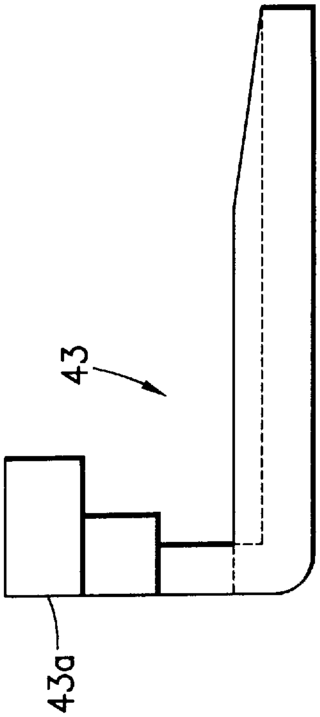
FIG. 29 is a plan view.
Figure 32:
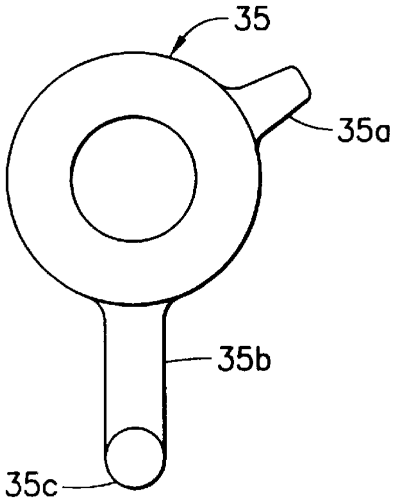
FIG. 32 is a plan view showing a rotor.
Figure 35:
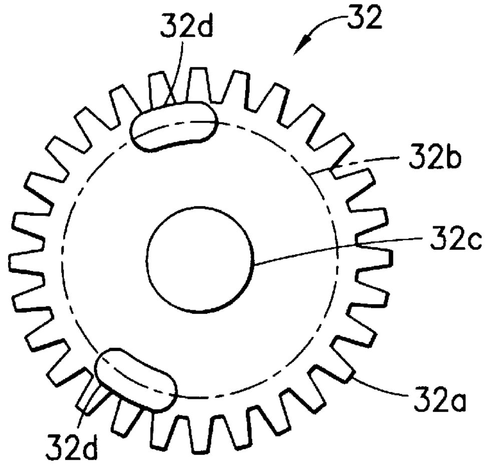
FIG. 35 is a side view showing a second gear.
Figure 33:
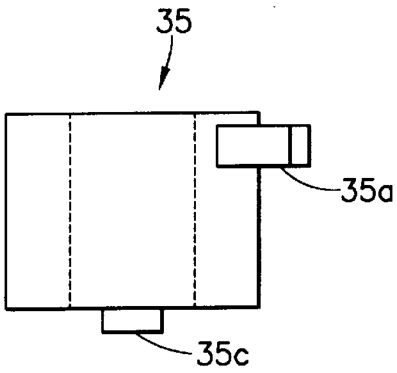
FIG. 33 is a front view.
Figure 36:
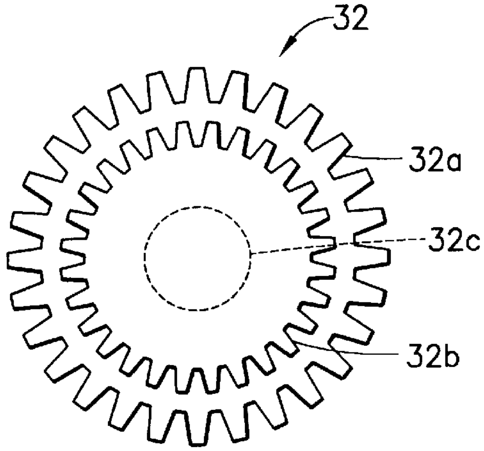
FIG. 36 is a partly enlarged view.
Figure 34:
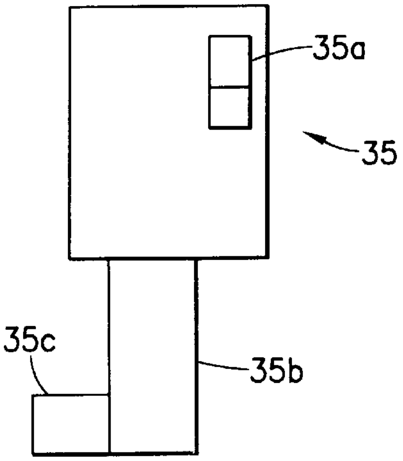
FIG. 34 is a side view.
Figure 37:
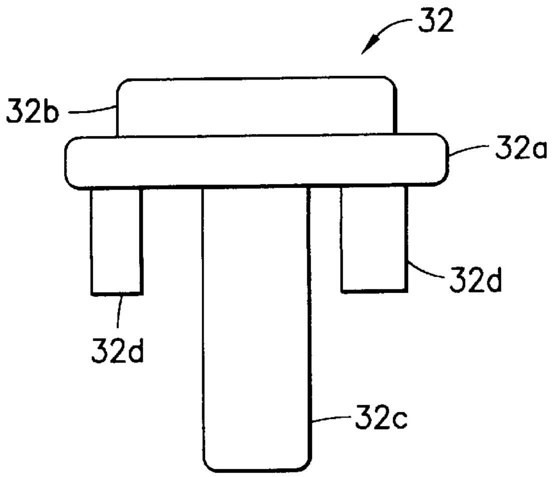
FIG. 37 is a front view.
Figure 38:
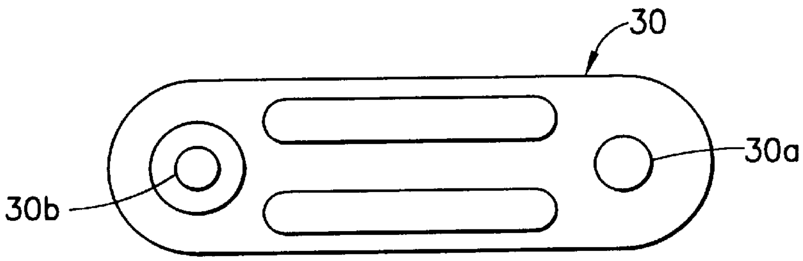
FIG. 38 is a plan view.
Figure 39:
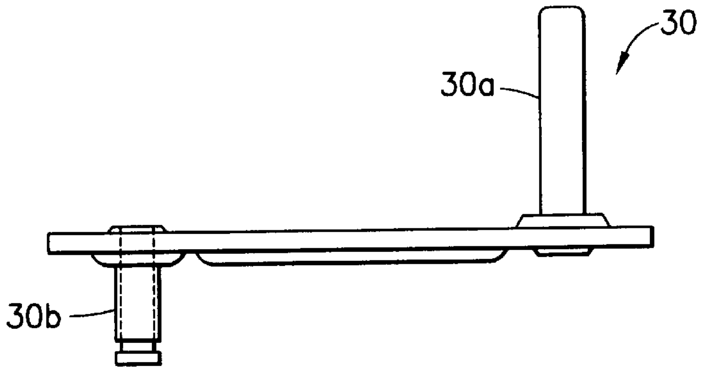
FIG. 39 is a front view showing a rack link.
Figure 40:
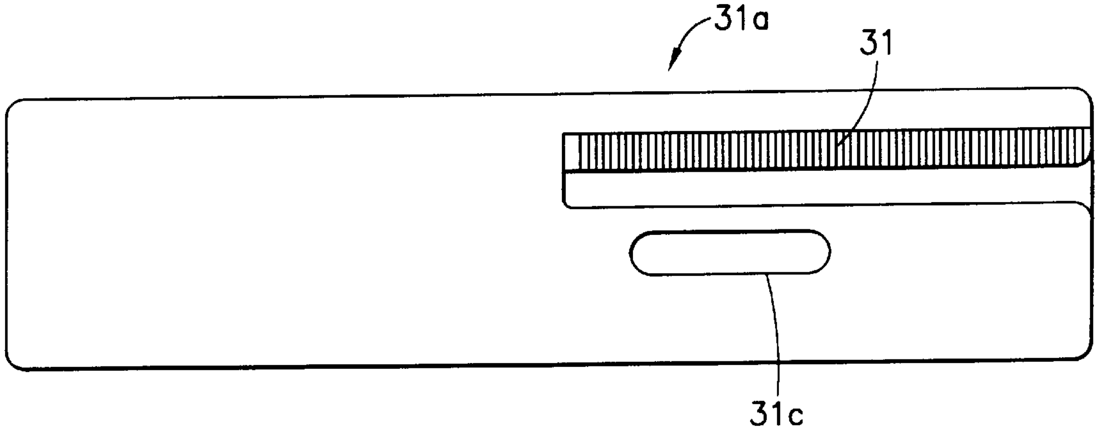
FIG. 40 is a plan view.
Figure 41:
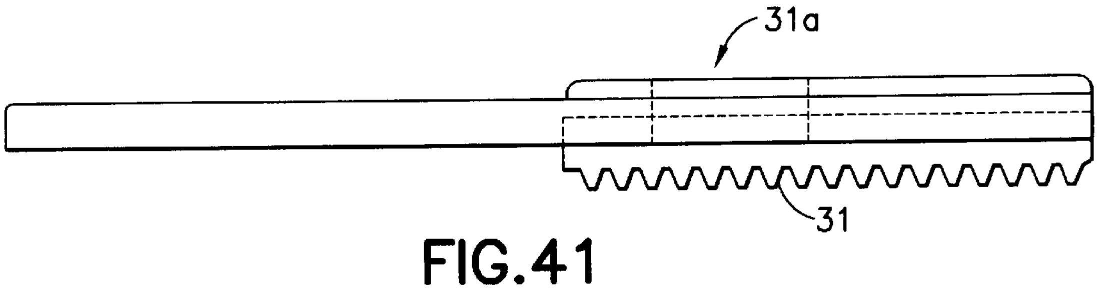
FIG. 41 is a front view showing a rack gear.
Figure 42:
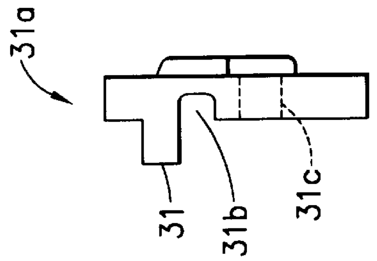
FIG. 42 is a plan view.
Figure 43:
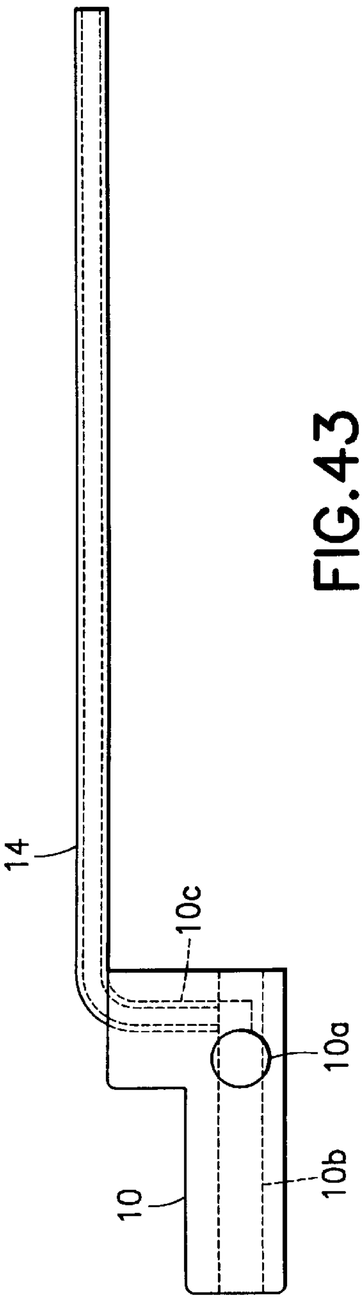
FIG. 43 is a side view.
Figure 44:
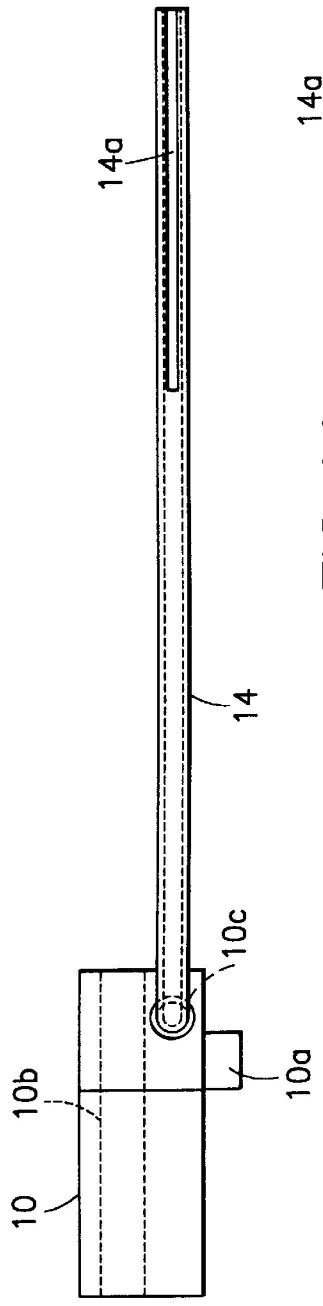
FIG. 44 is a plan view showing a piston bar and a piston holder.
Figure 45:
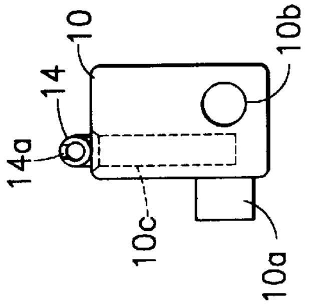
FIG. 45 is a front view.
Figure 46:
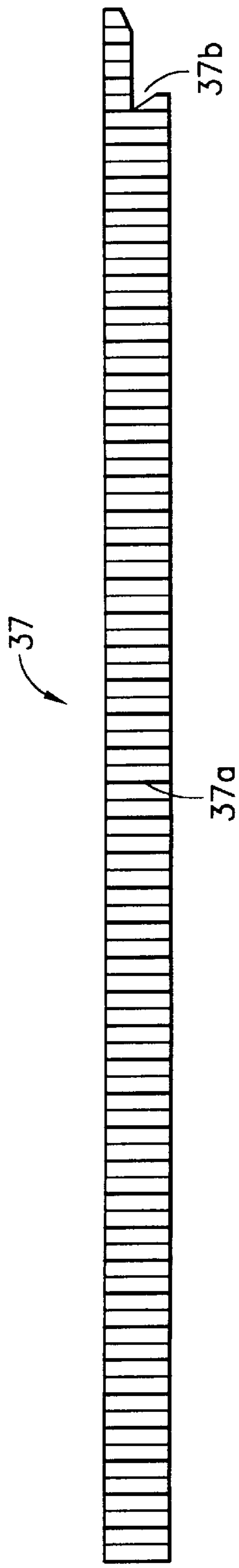
FIG. 46 is a side view of a belt body.
Figure 48:
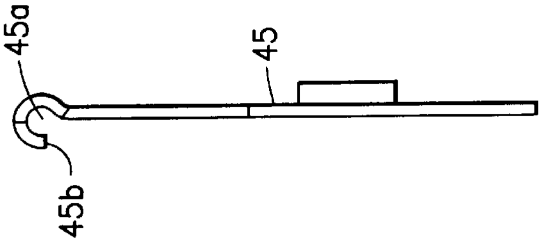
FIG. 48 is a side view.
Figure 47:
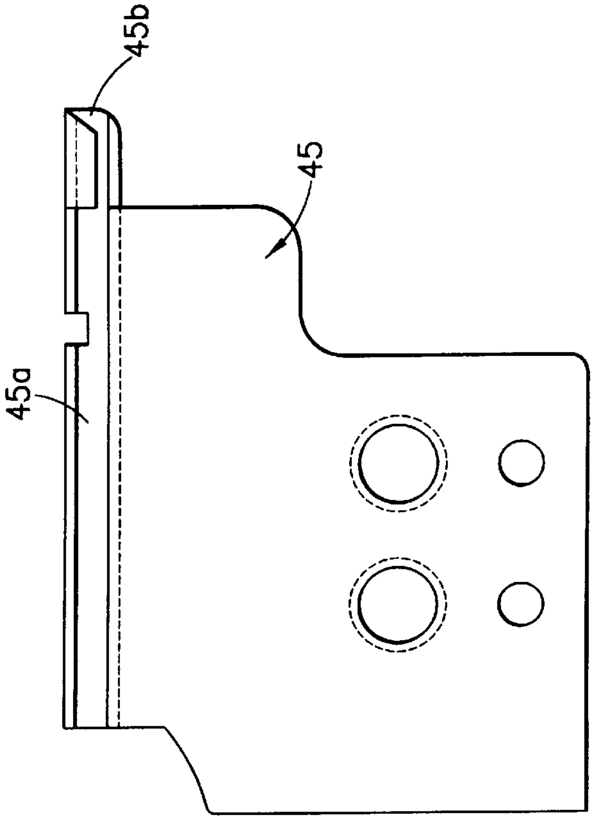
FIG. 47 is a plan view of a restraining plate.

Reference numeral 50 denotes a coiled spring. This coil spring 50 is wound around the shaft 32*c* with one end thereof engaged with the shaft 34*a*, so that a biasing force is applied to the intermediate length diameter gear 32 in a counterclockwise direction as shown by the lower arrow in FIG. 10. By this biasing force, a pulling force is applied to the feed bar 36 in a direction as indicated by the upper arrow in FIG. 10. As a consequence, a more reliable feed of the receiving portion side of the loop pin is ensured.

Reference numeral 37 denotes a belt member having a certain degree of flexibility. A rack 37*a* is formed on one surface of the belt member 37 and an attachment cutout portion is formed in its end portion. A distal end of this belt member 37 serves to push forward the receiving portion of the loop pin. The rack 37*a* is engaged with the most enlarged diameter gear 34, so that a motion of the rack gear 31 is increased in speed by a large gear ratio therebetween and actuated with a time lag with a progress of the insertion portion. Reference numeral 38 denotes a hook for feeding the loop pin.

On the other hand, reference numeral 39 denotes a receiving portion (female portion) guide for the loop pin which is bent into a J-shaped configuration. This receiving guide 39 consists of a base 39*a* and an upper 39*b* placed upon the base 39*a* and joined together by tightening screws 41. A groove 39*c* for allowing the receiving portion of the loop pin to pass therethrough and a slit 39*d* for guiding a string portion are formed in the receiving portion (female) guide 39. Its configuration at an area near its base end is rectangular and at an area near its distal end is of a circular end face. The receiving portion guide 39 is integrally provided with an attachment plate 40 on a base end side of the base 39*a*. The receiving portion guide 39 is secured to the body case 2 such that the groove 39*c* corresponds to the belt member 37.

A bent portion 39*a* is formed in the slit 39*d* for guiding (passing) the string portion of the loop pin at an area in the vicinity of a distal end thereof, so that the receiving portion (female portion) of the loop pin will not jump out.

Reference numeral 42 denotes a cutter corresponding to the aforementioned reference numeral 21. The individual loop pins cut from the loop pin magazine are fed at the insertion portion (male portion) and the receiving portion (female portion) by a respective mechanisms previously described. Finally, the insertion portion is inserted for locking into the receiving portion with a tag attached to a product of commerce. Reference numeral 43 denotes an auxiliary cover. This auxiliary cover 43 is provided with a generally L-shaped engagement portion 43*a* which is engaged for closing with the cover 44 of the receiving portion guide 39.

A restraining plate 45 is placed upon the attachment plate 40 and joined together by screws. A sectionally arcuate groove 45*a* for guiding the slide of the piston bar 14 is formed in one side edge of the restraining plate 45. A hook 45*b* for hooking for retention a through-hole of a tag is formed on a projecting end of the groove 45*a*.

An attacher of a loop pin for hooking a tag according to the present invention is constructed in the manner as mentioned above. Accordingly, a small sized attacher can be achieved compared with the conventional devices, and more reliable feeding of the insertion portion and the receiving portion of the loop pin can be obtained. When the loop pins are in the form of a loop pin magazine, cutting accuracy is increased and the loop pins are prevented from escaping from the attacher during operation. Moreover, a more smooth operation can be performed as compared with the prior art. In particular, the insertion portion can be cut off beforehand, where necessary. In that case, the receiving portion can be pushed by the cutting force. Because the gear ratios are greatly different, there can be obtained a feeding operation with a distinct time lag as compared with the prior art.

Although the present invention has been described in the form of one preferred embodiment, the present invention is not limited to this embodiment. Many changes and modifications can be made by those skilled in the art without departing from the spirit and scope of the present invention as defined in the appended claims.

What is claimed is:

1. An attacher of a loop pin for hooking a tag comprising:

a turnable lever connected to a lower end of a link which is biased in a predetermined direction;

a piston holder connected to another end of said link and capable of sliding forwardly and backwardly along a guide bar; and a tubular piston bar having a pressing portion formed with a slit at a distal end thereof, a rear end of said piston bar being bent into an L-shaped configuration and mounted on said piston holder.

2. An attacher of a loop pin for hooking a tag according to claim 1, further comprising a gear body driven by a rack gear which is connected to said link through a crank-like rack link and engageable with a belt for pressing a receiving portion of said loop pin, and a feed bar operatively connected to said piston holder so as to be driven through a rotor which is provided with at least two projecting engagement portions.

3. An attacher of a loop pin for hooking a tag according to claim 2, wherein said rack link is constructed such that a time lag in feeding said loop pin is obtained between an insertion portion and a receiving portion.

4. An attacher of a loop pin for hooking a tag according to claim 1, further comprising an auxiliary cover for cutting a loop pin magazine into individual loop pins connected to a base portion of a receiving portion guide which is formed in a J-shaped configuration.

5. An attacher of a loop pin for hooking a tag according to claim 1, further comprising a load portion for said loop pin having a pin guide.

6. An attacher of a loop pin for hooking a tag according to claim 1, further comprising a receiving guide portion having a J-shaped configuration, wherein a terminal end of a guide groove for said receiving portion guide is bent.

7. An attacher of a loop pin for hooking a tag according to claim 1, further comprising a restraining plate placed upon an attachment plate for a receiving portion guide which is formed in a J-shaped configuration, said restraining plate being provided at one end thereof with a guide groove for said piston bar, with a tag hook portion being formed at a distal end of said guide groove.

8. An attacher of a loop pin for hooking a tag according to claim 2, wherein said gear body comprises:

an enlarged diameter gear and a reduced diameter gear, said enlarged diameter gear being engageable with said belt and said reduced diameter gear being engageable with an intermediate length diameter gear which is engageable with a rack gear, wherein a plurality of said loop pins are connected together in parallel relation at said receiving portion and insertion portion; and a cutter for cutting the loop pin assembly into individual loop pins from said receiving portion and insertion portion, wherein said intermediate length diameter gear includes two coaxial gears having different diameters, one of said two coaxial gears having a smaller diameter being engaged with said rack gear and the remaining coaxial gears having a larger diameter being engaged with said reduced diameter gear of said gear body, so that due to a gear ratio therebetween, a time lag in feeding of the loop pin between said receiving portion and said insertion portion can be obtained.

9. An attacher of a loop pin for hooking a tag according to claim 8, wherein said rack gear further comprises a releasing groove for avoiding physical contact with the enlarged diameter portion of said intermediate length diameter gear.

10. An attacher of a loop pin for hooking a tag according to claim 8, further comprising a coiled spring for biasing said intermediate length diameter gear in a counterclockwise direction wound around a shaft member of said intermediate length diameter gear, so that a feeding force of said receiving portion for the loop pin is increased.

11. An attacher of a loop pin for hooking a tag according to claim 2, further comprising an auxiliary cover for cutting a loop pin magazine into individual loop pins connected to a base portion of a receiving portion guide which is formed in a J-shaped configuration.

12. An attacher of a loop pin for hooking a tag according to claim 2, further comprising a load portion for said loop pin having a pin guide.

13. An attacher of a loop pin for hooking a tag according to claim 4, further comprising a load portion for said loop pin having a pin guide.

14. An attacher of a loop pin for hooking a tag according to claim 2, further comprising a receiving guide portion having a J-shaped configuration, wherein a terminal end of a guide groove for said receiving portion guide is bent.

15. An attacher of a loop pin for hooking a tag according to claim 4, wherein a terminal end of a guide groove for said receiving portion guide which is formed in a J-shaped configuration is bent.

16. An attacher of a loop pin for hooking a tag according to claim 5, further comprising a receiving guide portion having a J-shaped configuration, wherein a terminal end of a guide groove for said receiving portion guide is bent.

17. An attacher of a loop pin for hooking a tag according to claim 2, further comprising a restraining plate placed upon an attachment plate for a receiving portion guide which is formed in a J-shaped configuration, said restraining plate being provided at one end thereof with a guide groove for said piston bar, with a tag hook portion being formed at a distal end of said guide groove.

18. An attacher of a loop pin for hooking a tag according to claim 4, further comprising a restraining plate placed upon an attachment plate for said receiving portion guide which is formed in a J-shaped configuration, said restraining plate being provided at one end thereof with a guide groove for said piston bar, with a tag hook portion being formed at a distal end of said guide groove.

19. An attacher of a loop pin for hooking a tag according to claim 5; further comprising a restraining plate placed upon an attachment plate for a receiving portion guide which is formed in a J-shaped configuration, said restraining plate being provided at one end thereof with a guide groove for said piston bar, with a tag hook portion being formed at a distal end of said guide groove.

20. An attacher of a loop pin for hooking a tag according to claim 9, further comprising a coiled spring for biasing said intermediate length diameter gear in a counterclockwise direction wound around a shaft member of said intermediate length diameter gear, so that a feeding force of said receiving portion for the loop pin is increased.

* * * * *